Dec. 17, 1946.   M. PRAGER   2,412,833
BOTTLE CLOSURE DEVICE
Filed March 10, 1945
Fig. 1
Fig. 2
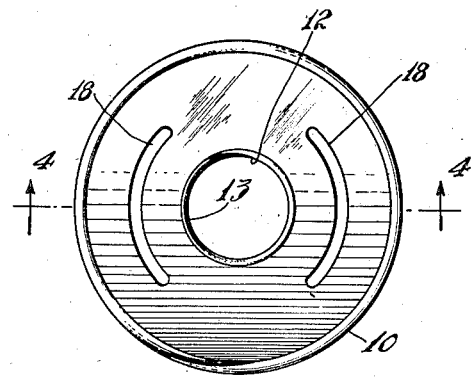
Fig. 3
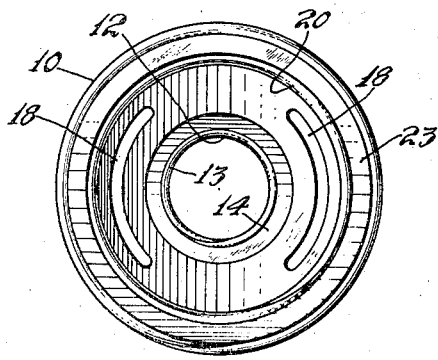
Fig. 4
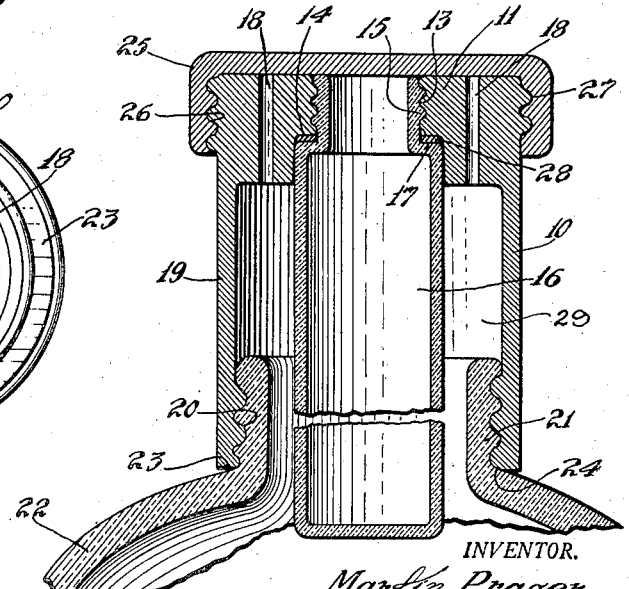
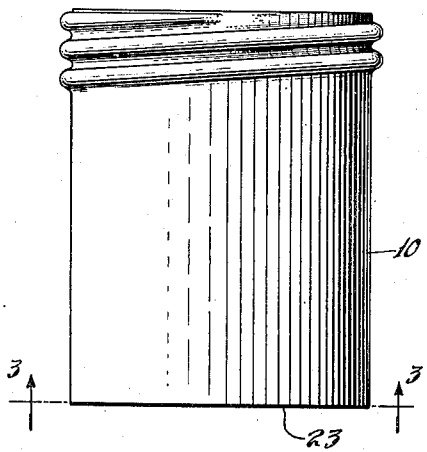
INVENTOR.
Martin Prager
BY
ATTORNEY Patented Dec. 17, 1946

2,412,833

UNITED STATES PATENT OFFICE 2,412,833

BOTTLE CLOSURE DEVICE

Martin Prager, Irvington, N. J.

Application March 10, 1945, Serial No. 581,995

1 Claim. (Cl. 215—6)

This invention relates to improvements in bottle closure devices. In carrying out my invention, I have provided a bottle closure device comprising a dispensing cap provided with means for securing a small bottle thereto in a manner which will provide for the interlocking of the parts on assembly.

A further object of the invention is to provide a bottle closure device adapted to be secured to the neck portion of a bottle in a manner to provide means for dispensing the ingredients of said main bottle and of the smaller bottle positioned in said dispensing cap simultaneously, when so desired.

A further object of the invention is to provide means for closing the dispensing cap apertures through which the contents of the main and small bottles may be dispensed.

A further object of the invention is to provide a dispensing cap having the features enumerated above, adapted to be removably secured to a large bottle so that the contents of the latter may be dispensed directly therefrom, when so desired.

A further object of the invention is to provide a dispensing cap of the structure described having novel structural features which will preclude displacement of the parts when assembled and will provide for positive operation of the device at all time.

The dispensing cap above referred to and illustrated in the accompanying drawing, is adapted for use in the dispensing of a plurality of liquids contained in a small bottle suspended within a larger bottle and in the latter—for example, for the dispensing of fruit juices or other natural liquids contained in the main bottle and for the dispensing of a complementary liquid contained in the small bottle for flavoring or other purposes.

These and other advantageous objects, which will later appear, are accomplished by the simple and practical construction and combination of parts hereinafter described and more particularly shown in the drawing, illustrating an embodiment of my invention, and in which:

Fig. 1 is a side elevational view of a dispensing cap made in accordance with my invention, Fig. 2 is a top plan view of the dispensing cap, Fig. 3 is a bottom plan view of the dispensing cap taken on line 3—3 of Fig. 1 in the direction of the arrows, and Fig. 4 is a vertical transverse sectional view taken on line 4—4 of Fig. 2 in the direction of the arrows and showing, fragmentarily, the large bottle to which the dispensing cap of my invention is applied, the small bottle suspended in the dispensing cap being shown partly fragmentarily.

Referring to Fig. 4, the dispensing cap 10 embodying my invention, which may be made of any suitable or convenient material, as for example, by molding the same of a plastic material, is shown for use in connection with a large bottle 22 and a small bottle 16. The large bottle 22 has a threaded neck 21, the small bottle 16 having a threaded neck 15 and a shouldered portion 17 adjacent said threaded neck. The dispensing cap 10 comprises an elongated member 19 open at its lower end 23 and formed with internal threads 20 at its lower end for threaded engagement with the threaded neck 21 of the large bottle 22. A thickened head 11 is carried by the upper end of the body member 19 of the cap 10, the upper face of the thickened head being flat. The body member 19 is formed with external threads 26 at its upper end and the thickened head 11 is formed with a medial through aperture 12, the upper portion of said aperture being threaded as at 13 to receive the threaded neck 15 of the small bottle 16, to suspend the small bottle within the body member from said head portion. A shoulder 14 is formed in the head portion inwardly of the bottom face of the thickened head and at the base of the threaded portion of the medial aperture to receive the shouldered portion 17 of the small bottle. The head portion is formed with additional apertures 18 surrounding the medial aperture 12 whereby the contents of the large bottle may be dispensed therethrough. All of the apertures terminate at their upper ends in the flat upper face of the head portion 11. A closure cap 25 is provided with a flat top portion and a depending skirt portion internally threaded as at 27 for threaded engagement with the externally threaded upper end of the body member 19 of the dispensing cap 10. Said flat top portion of the cap 25 covers all of the apertures and the open end of the small bottle when fitted against the flat upper face of the head portion.

By the use of the structure described, the large bottle 22 may be filled with one or more liquids or the like to be mixed with the complementary matter contained within the small bottle 16, so that by tilting the bottle 22, to which the dispensing cap 10 (and the small bottle 16 suspended therefrom) is affixed, the ingredients of the main bottle will be dispensed through the apertures 18 while the ingredients of the small bottle are dispensed through the aperture 12 of the cap, the contents of both bottles mixing as they are dispensed through the cap 10.

If desired, washers may be employed at suitable points, as for example, washer 28 interposed between the shoulder portion of the small bottle 16 and the shoulder portion of the medial aperture 12.

It will be noted that by the structure described, the small bottle is medially suspended in the neck of the large bottle; the chamber 29, defined by the inside of the cap 10 and the neck of the bottle 22 and partially closed by the small bottle 16 suspended from the dispensing cap 10, is the chamber through which the matter from the bottle 22 passes into the apertures 18 when the bottle 22 is titled. The apertures 18 are shown in Fig. 2 as being of generally elongated, circular outline; it will be understood that the same may be of any other outline desired. In the assembly of the device as shown in Fig. 4, the lower end 23 of the elongated body member 19 of the dispensing cap 10 abuts the flared portion 24 of the large bottle 22 to lock the parts together.

Having thus described my invention what I claim as new and desire to secure by Letters Patent, is:

In combination with a large bottle having a threaded neck and a small bottle having a threaded neck and a shouldered portion adjacent its threaded neck, a dispensing cap comprising an elongated body member open at its lower end and formed with internal threads at its lower end in threaded engagement with the threaded neck of the large bottle, a thickened head carried by the upper end of said body member, the upper face of the thickened head being flat, said body member being formed with external threads at its upper end, said thickened head being formed with a medial through aperture, the upper portion of said aperture being threaded and receiving the threaded neck of the small bottle and suspending the small bottle within the body member from said head portion, a shoulder formed in said head portion inwardly of the bottom face of the thickened head and at the base of the threaded portion of the medial aperture and receiving the shouldered portion of the small bottle, said head portion being formed with additional apertures surrounding the medial aperture, whereby the contents of the large bottle may be dispensed therethrough, all of the apertures terminating at their upper ends in the flat upper face of the head portion, a closure cap having a flat top portion and an internally threaded depending skirt portion in threaded engagement with the externally threaded upper end of the body member, said flat top portion of the closure cap covering all of the apertures and the open upper end of the small bottle when seated against the flat upper face of the head portion.

MARTIN PRAGER.